Dec. 10, 1963   J. G. JANSSON   3,113,450
SENSING DEVICE FOR THE CONCENTRATION OF FIBRE SUSPENSIONS
Filed March 27, 1961   2 Sheets-Sheet 1
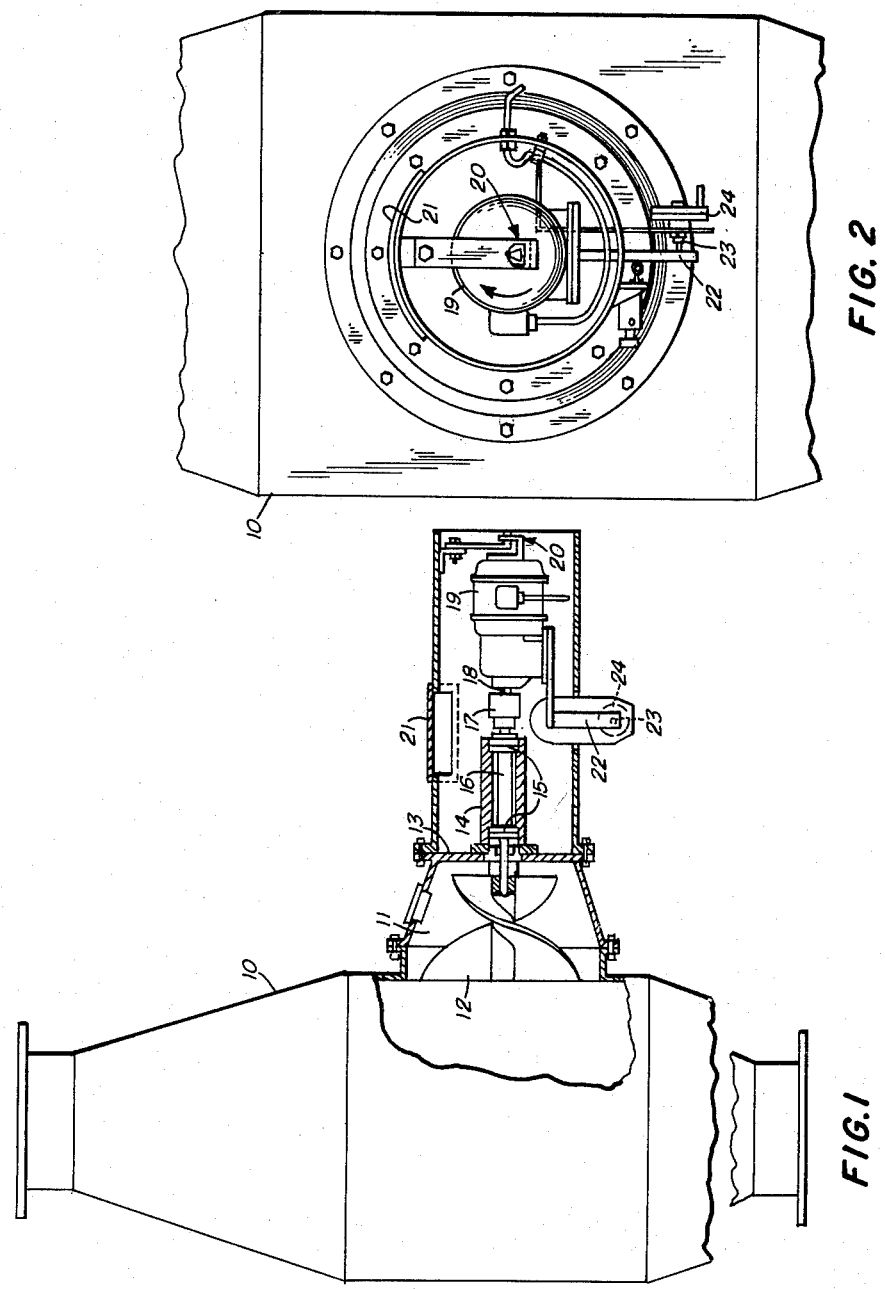

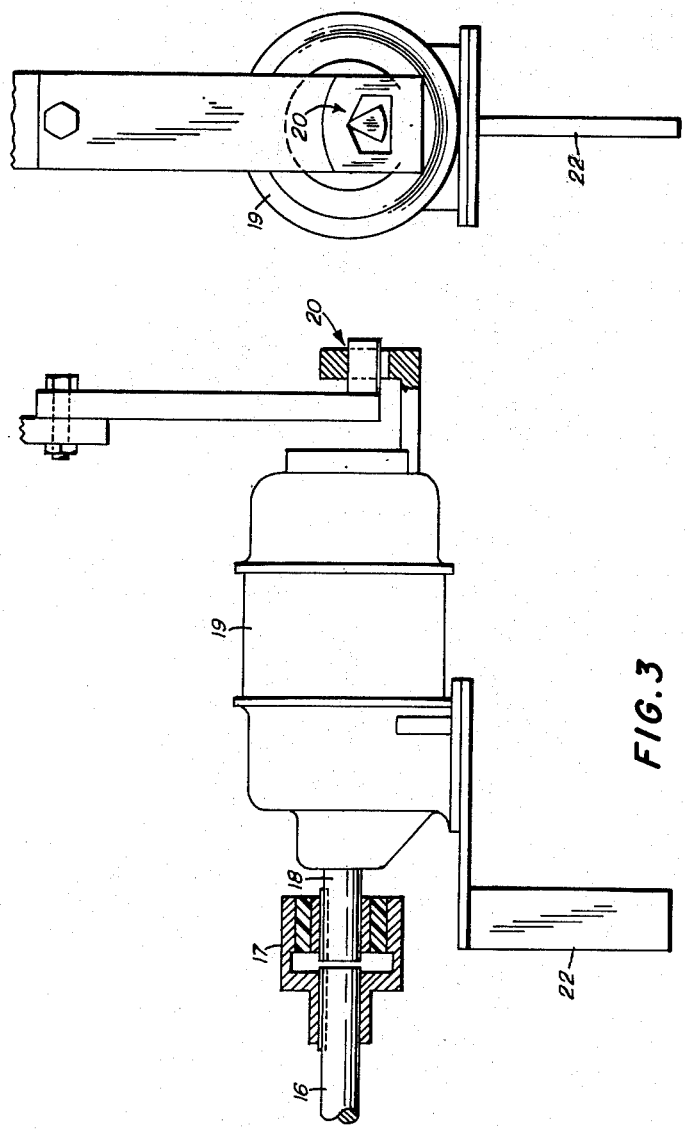

United States Patent Office 3,113,450
Patented Dec. 10, 1963

3,113,450
SENSING DEVICE FOR THE CONCENTRATION OF FIBRE SUSPENSIONS
Johannes Gerhard Jansson, Stockholm, Sweden, assignor to Aktiebolaget A. Ekstroms Maskinaffar, a Swedish joint-stock company
Filed Mar. 27, 1961, Ser. No. 98,471
Claims priority, application Sweden Apr. 7, 1960
6 Claims. (Cl. 73—59)

This invention relates to a device adapted to sense the concentration of fibre suspensions, for example such used in the manufacture of pulp. In order to obtain the desired optimum result both technically and economically, the concentration of the fibre suspension must be maintained constant during the manufacturing process. For this purpose, it is essential to sense the said concentration value at each moment and to translate possible variations in the concentration into impulses for actuating control means to perform appropriate measures for maintaining the suspension concentration constant, for example by increasing or decreasing the amount of diluting water to be added to the suspension.

As a measure of the concentration may be utilized the friction caused by the suspension on a sensing means, for example a rotary propeller or the like, which friction increases with increasing thickness of the suspension, and vice versa. However, when such a rotary, or in any other manner movable sensing means is placed in a flow pipe for the suspension, one cannot expect the resistance to motion acting on the sensing means to follow the relation found to exist between the concentration and the frictional resistance at a certain rate of flow in an accurate manner even at a different flow rate. This is due to the fact, that the friction also depends on the rate of the flow, i.e. if the relative rate between the sensing means and the suspension is subject of variation, for example caused by rate variations in the flow pipe, the regulation of the concentration will be affected such, that there will be also variations in the concentration. As a general rule one may say, that the friction decreases with increasing relative rate, but the quantitive conditions prevailing in this connection are still calling for research.

In conventional embodiments comprising a movable sensing means and utilizing the variations in resistance to the motion of the same for giving impulses to the control means, the rotary motor drives a propeller by means of a planetary-type gear, the variations in the rotary moment of the propeller being used for giving the impulses to the control means. According to another embodiment, the variation in the electrical energy supplied to the gear wheel motor is utilized for the said impulse transmission. Both embodiments, however, include a source of error, namely that the frictional torque caused in the gear wheels and bearings is added to the frictional torque produced on the rotary body.

Another known embodiment, it is true, operates after a quite different principle with satisfactory accuracy, but this embodiment is based on a partially open flow channel for the suspension, which gives rise to disadvantages of a different nature, such as for example greater dependability with respect to the level when the channel is being laid, air admission, resinifications, foaming, and greater risk of inundation than with closed channels. For this reason, in the industry concerned the channel is generally desired to be closed.

The present invention eliminates the aforesaid disadvantages involved in closed channels of known arrangements and renders possible a fully accurate concentration control even at varying suspension flow rates, in that a rotary body operated at constant speed by a motor is placed in a chamber located on the side of and in direct connection with the closed flow channel of the suspension. A secondary flow circulating through the chamber remains substantially unaffected by the variations in the rate of the main flow, so that the influence exerted by the main flow rate on the sensing of the torque required for operating the rotary body is eliminated. According to a further characterizing feature of the invention, the influence exerted by the frictional torque in the gear wheels, bearings etc. of the motor is eliminated, in that the operating motor is mounted to rotate freely about the motor axis and arranged such, that its rotational torque actuates an impulse transmitting means, for example a pressure capsule connected in a control circuit to a control means, for example a valve, to adjust the said valve such, that in accordance with the concentration sensed at each moment by the rotary body the amount of diluting water to be added to the suspension is increased or decreased for maintaining the concentration of the fibre suspension constant.

According to still another characterizing feature of the invention, the replacement of the suspension in the said chamber is facilitated, in that the interior of the chamber is tapered in such a manner, that the wider end portion is connected to the main flow channel. Thanks to this chamber design, the formation of pockets causing the suspension to stagnate and affecting the sensing in a disturbing manner, is prevented to a great extent.

The rotary body may be a propeller of suitable design, adapted to replace the suspension in the chamber so that it always has the same concentration as the suspension flowing through the flow channel. The rotary body may be designed and constructed in different ways, provided that it is capable of bringing about the necessary replacement of the suspension in the chamber.

An embodiment of the invention will now be described, reference being had to the accompanying drawings in which:

FIGURE 1 shows a longitudinal section of a portion of the flow channel comprising a sensing device according to the invention, FIGURE 2 shows on an enlarged scale an end view seen from the right of the central portion of the device in FIGURE 1, FIGURE 3 is an enlarged fragmentary view of FIGURE 1 with parts in section showing the motor and suspension means therefor, and FIGURE 4 is a fragmentary end view of the motor suspension means shown in FIGURE 3.

10 designates a pipe which may be connected at any place within the manufacturing process applying fibrous suspension, for example, pulp manufacture, through which pipe the fibrous suspension is fed. For maintaining the suspension concentration constant, a sensing device is adapted to give impulses to an actuating means connected in the circuit to a control means such, that at a tendency of the concentration to fall below a predetermined value the concentration is increased, and that at a tendency of the concentration to raise above another predetermined value the concentration is decreased.

In the embodiment shown, the sensing device is a propeller 12 disposed in a conical chamber 11 which is in open connection with a widened portion of pipe 10, the smaller end portion of the chamber 11 being sealed by a plate 13. An oblong hub 14 secured in the centre of the plate 13 includes ball bearings 15 for the shaft 16 of the propeller, the end of the propeller shaft 16 being connected with the projecting shaft end 18 of an electromotor 19 with built-in reduction gears by means of a preferably flexible coupling 17 arranged outside the hub. The motor is suspended in the said coupling 17 and with its opposite shaft end portion in a knife-edge suspension 20, as shown in FIGURES 3 and 4, supported in a housing 21 enclosing the motor and rigidly secured to the plate 13.

Owing to the motor suspension along its axis, the motor seeks by turning about its axis to balance the moment produced for rotating the propeller 12, but is prevented to perform this turning motion by an arm 22 rigidly connected with the motor, the free end portion of the arm engaging a stud member 23 (FIG. 2) combined with an actuating means in the form of an air-filled pressure capsule 24 which is, for example, connected in a control circuit for a control valve. An increase in the motor torque caused by an increase in the resistance to the propeller rotation gives rise to an increased pressure on the stud 23, whereby the pressure in the pressure capsule 24 is increased and the valve is adjusted by suitable means (not shown) in such a manner, that the concentration of the fibrous suspension is decreased. This chain of reactions develops in the opposite manner when the resistance to the rotation of the propeller 12 is decreasing. In this manner, the concentration is maintained within certain predetermined limits which may lie as near another as one may desire.

By placing the propeller 12 in the frusto-conical chamber 11 (which may have a tapering of different shape, for example pyramidal), the propeller operates in a part of the suspension withdrawn from the main flow and, therefore, not being subjected to variations in the flow rate which may occur in the main flow. In order to prevent stagnation of the suspension flow through the chamber, particularly in the innermost corners at the same rate as in the main channel, the chamber is tapered from the main channel, whereby the outflow of liquid even from the innermost chamber portions is facilitated. The replacement of the liquid in the chamber is effected by the propeller 12.

The propeller may be replaced by any other rotary member rendering the same effect, for example a vane having a profile which preferably corresponds to the longitudinal section of the chamber but is of smaller size, to leave space between the vane edges and the inner chamber walls. These inner walls may be provided with guide plates or bars to further the necessary circulation of the liquid.

What I claim is:

1. A device for sensing the concentration of fibers in suspension in a fluid flow through a conduit comprising an opening in the side of said conduit, a housing mounted on said conduit and around said opening, said housing forming a chamber adjacent said conduit and in communication with the interior thereof solely by way of said opening, rotor means in said chamber, drive means for said rotor, said rotor being constructed and arranged relative to the opening to circulate fluid from said conduit through said chamber, and means responsive to variation in resistance of rotation of said rotor in the fluid to sense the concentration of fibers carried in suspension therein.

2. A device as defined in claim 1, wherein said chamber includes wall portions defining an area of decreasing dimension in a direction away from said conduit.

3. A device as defined in claim 2, wherein the area of greatest dimension defined by the wall portions of said chamber is at the point of communication of said chamber and said conduit.

4. A device for sensing the concentration of fibers in suspension in a fluid flow through a conduit comprising an opening in the side of said conduit, a housing mounted on said conduit and around said opening, said housing forming a chamber fixed to the wall of said conduit and in communication with the interior thereof solely by way of said opening, a rotor in said chamber, a motor drivingly connected to said rotor, said rotor being constructed and arranged relative to the opening to circulate fluid from said conduit through said chamber, and means responsive to variation in the torque of said motor to sense the concentration of fibers in the fluid.

5. A device as defined in claim 4, wherein said chamber includes frusto-conical wall portions defining an area of decreasing dimension in a direction away from said conduit.

6. A device as defined in claim 4, wherein said rotor includes spiral vanes.

References Cited in the file of this patent

UNITED STATES PATENTS

| | | |
|---|---|---|
| 1,985,313 | Bryson | Dec. 26, 1934 |
| 2,023,106 | Staege | Dec. 3, 1935 |
| 2,031,018 | Thomas | Feb. 18, 1936 |
| 2,354,923 | McNamee | Aug. 1, 1944 |
| 3,027,756 | Head | Apr. 3, 1962 |